Aug. 30, 1955  A. J. SOUCY  2,716,572
RAINSHIELD FOR AUTOMOBILE WINDSHIELDS
Filed June 15, 1953
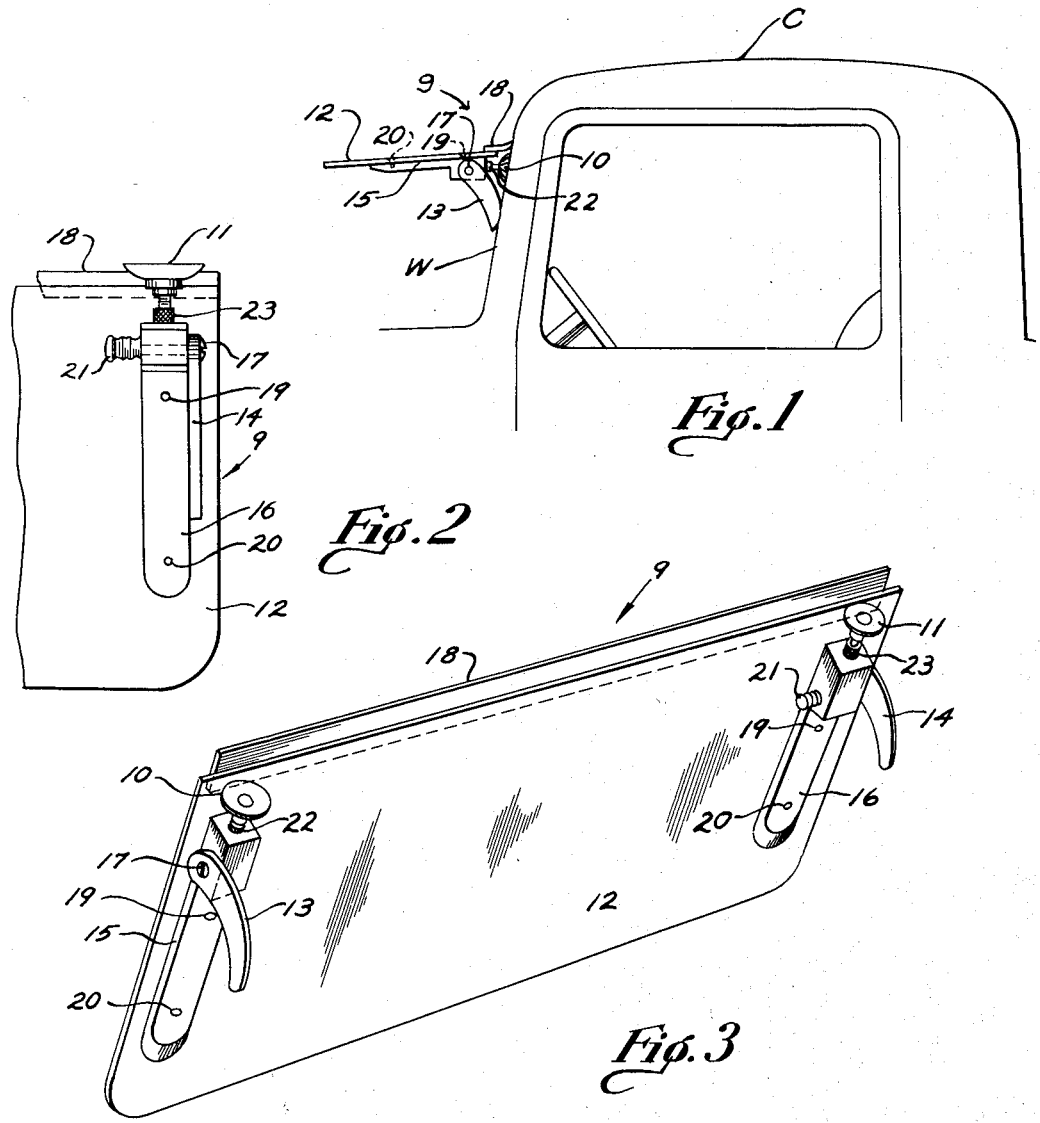
INVENTOR.
ARMAND J. SOUCY
BY
H. G. Manning
ATTORNEY

# United States Patent Office 2,716,572
Patented Aug. 30, 1955

2,716,572

RAINSHIELD FOR AUTOMOBILE WINDSHIELDS

Armand J. Soucy, Bristol, Conn.

Application June 15, 1953, Serial No. 361,607

2 Claims. (Cl. 296—95)

This invention relates to a detachable, adjustable, auxiliary rainshield which is especially adapted for use on automobiles when parked in drive-in theaters.

One object of the present invention is to provide a rainshield of the above nature, which may be readily affixed to the windshield of a motor vehicle by means of suction cups.

A further object is to provide a rainshield attachment of the above nature, which may be expeditiously mounted upon and removed from the windshield whenever desired.

A further object is to provide a device of the above nature which will be simple in construction, inexpensive to manufacture, easy to install and manipulate, compact, ornamental in appearance and very efficient and durable in use.

With these and other objects in view, there has been illustrated on the accompanying drawing, one form in which the invention may conveniently be embodied in practice.

In the drawing,

Fig. 1 represents a side view of the improved rainshield, as it appears when attached in front of the windshield of a motor vehicle.

Fig. 2 is a fragmentary view of one end of the rainshield panel showing a rectangular bracket, a brace arm and its screw and locking nut, a suction cup and its adjusting nut.

Fig. 3 is a perspective view of the rainshield as it appears when detached from the windshield of the motor vehicle.

Referring now to the drawing, in which like reference characters denote corresponding parts throughout the several views the letter C indicates a motor vehicle having a windshield W located ahead of the front seat. The rainshield of the present invention is indicated generally by the numeral 9, and is attached by suction cups 10 and 11 to the upper glass portion of the front windshield W.

The rainshield 9 includes a flexible, plastic, transparent panel 12 having a pair of rectangular forwardly-extending brackets 15 and 16 preferably made of plastic secured thereto on opposite ends thereof by means of two pairs of screws 19 and 20 and also preferably cemented thereto.

In order to hold the rainshield 9 at any desired angular position with respect to the windshield W, provision is made of a pair of curved brace arms 13 and 14 held frictionally against the outer sides of said brackets 15 and 16 by means of a pair of horizontal headed screws 17 and interior knurled locking nuts 21.

Provision is also made of a horizontal flexible soft rubber blade 18 located at the top rear edge of the rainshield panel 12 to prevent the rain which falls down from the top of the motor vehicle from flowing upon the windshield W.

In order to maintain the suction cup shafts at right angles to the glass pane of the windshield W, a pair of knurled adjusting nuts 22, 23 are mounted upon the threaded shafts of said suction cups 10 and 11.

Operation

In operation, the longitudinally adjustable suction cups 10 and 11 will first be moistened and attached to the windshield W of the parked motor vehicle C.

The angle of tilt of the flexible plastic rainshield 9 will then be adjusted by manipulating the braces 13 and 14, the screws 17 and 21, and the nuts 22, 23 as desired, said braces being held frictionally against the brackets 15 and 16 by means of the adjustable screws 17 and nuts 21.

The rubber strip 18, will be held tightly against the front surface of either a flat or curved windshield so as to deflect the rain in such a manner as to provide clear vision of the motion picture through the windshield W.

It will be understood that the rainshield panel 12 by reason of its flexibility will fit either a straight or curved windshield and may be installed on any motor vehicle now in common use.

While there has been disclosed in this specification, one form in which the invention may be embodied, it is to be understood that this form is shown for the purpose of illustration only and that the invention is not to be limited to the specific disclosure but may be modified and embodied in various other forms without departing from its spirit. In short the invention includes all the modifications and embodiments coming within the scope of the following claims.

Having thus fully described the invention what is claimed as new and for which it is desired to secure Letters Patent is:

1. In a rainshield for a windshield of a motor vehicle parked in a drive-in theater, a flexible transparent rectangular waterproof panel, a pair of brackets secured on the short ends of said panel, a pair of rubber suction cups adjustably secured to the rear ends of said brackets, and a pair of curved flat pointed brace arms adjustably mounted in abutment with the outer sides of said brackets and having their free pointed extremities in engagement with the windshield so as to control the angular position of said rainshield with respect thereto.

2. The invention as defined in claim 1, in which said suction cups have screw shafts upon which knurled nuts are mounted for engaging the rear ends of said brackets to lock said suction cups in adjusted positions.

References Cited in the file of this patent

UNITED STATES PATENTS

| 641,893 | Roberts | Jan. 23, 1900 |
| 1,204,122 | Bowman | Nov. 7, 1916 |
| 1,460,645 | Duncan | July 3, 1923 |
| 1,600,461 | Ensign | Sept. 21, 1926 |
| 2,174,941 | Jones | Oct. 3, 1939 |
| 2,527,899 | Valasek | Oct. 31, 1950 |